US012592053B2

(12) United States Patent
Chang

(10) Patent No.: US 12,592,053 B2
(45) Date of Patent: Mar. 31, 2026

(54) METHOD FOR ADJUSTING A REGION OF INTEREST IN A DYNAMIC IMAGE FOR ADVANCED DRIVER-ASSISTANCE SYSTEM, AND IN-VEHICLE ELECTRONIC DEVICE FOR IMPLEMENTING THE METHOD

(71) Applicant: MiTAC Digital Technology Corporation, Taoyuan City (TW)

(72) Inventor: Yu-Sheng Chang, Taoyuan City (TW)

(73) Assignee: MiTAC Digital Technology Corporation, Taoyuan City (TW)

( * ) Notice: Subject to any disclaimer, the term of this patent is extended or adjusted under 35 U.S.C. 154(b) by 279 days.

(21) Appl. No.: 18/612,182

(22) Filed: Mar. 21, 2024

(65) Prior Publication Data

US 2024/0320949 A1     Sep. 26, 2024

(30) Foreign Application Priority Data

Mar. 24, 2023     (TW) .................................. 112111133

(51) Int. Cl.
*G06V 10/25* (2022.01)
*G06T 7/536* (2017.01)
*G06V 20/56* (2022.01)

(52) U.S. Cl.
CPC .............. *G06V 10/25* (2022.01); *G06T 7/536* (2017.01); *G06V 20/588* (2022.01); *G06T 2207/30256* (2013.01)

(58) Field of Classification Search
None
See application file for complete search history.

(56) References Cited

U.S. PATENT DOCUMENTS 11,449,705 B2 *   9/2022   Yershov ............. B60W 60/0011
11,557,052 B2 *   1/2023   Choi .................... G06V 20/588
(Continued)

FOREIGN PATENT DOCUMENTS

CN     201514864 A     4/2015
CN     108932472 A     12/2018
(Continued)

OTHER PUBLICATIONS

Search Report appended to an Office Action, which was issued to Taiwanese counterpart application No. 112111133 by the TIPO on Dec. 6, 2023, with an English translation thereof.

*Primary Examiner* — Anand P Bhatnagar
(74) *Attorney, Agent, or Firm* — Blank Rome LLP

(57)          ABSTRACT

A method for adjusting a region of interest (ROI) in a dynamic image is implemented by an in-vehicle electronic device installed on a vehicle. The method includes: for each of a first predetermined number of successive image frames, detecting a pair of lane line segments and an intersection point; using the first predetermined number of pairs of lane line segments and the first predetermined number of intersection points, determining a first vanishing point and a temporary ROI; for each of a second predetermined number of successive image frames, calculating a pair of slopes associated with the pair of lane line segments within the temporary ROI; obtaining a second vanishing point based on the second predetermined number of pairs of slopes; and in a case where the second vanishing point and the first vanishing point correspond with one another, storing the temporary ROI as an updated ROI.

18 Claims, 5 Drawing Sheets

(56) References Cited

U.S. PATENT DOCUMENTS

| | | | | |
|---|---|---|---|---|
| 11,798,187 | B2 * | 10/2023 | Zheer ...................... | G06T 7/62 |
| 11,798,187 | B2 * | 10/2023 | Zaheer ...................... | G06T 7/62 |
| 12,175,695 | B2 * | 12/2024 | Zaheer .................... | G06N 7/01 |
| 12,412,291 | B2 * | 9/2025 | Kim ..................... | G06V 20/588 |
| 12,417,549 | B2 * | 9/2025 | Kim ....................... | G06V 10/44 |
| 2020/0410256 | A1 * | 12/2020 | Bayer ...................... | G06T 7/13 |
| 2021/0192231 | A1 * | 6/2021 | Lee ..................... | G05D 1/0231 |
| 2021/0237758 | A1 * | 8/2021 | Wang ................... | B60W 40/10 |
| 2021/0248392 | A1 * | 8/2021 | Zaheer ................. | G06V 10/82 |
| 2021/0256720 | A1 * | 8/2021 | Choi ...................... | G06T 7/536 |
| 2023/0096102 | A1 * | 3/2023 | Kim ...................... | G06V 10/44 |
| | | | | 382/103 |
| 2023/0097780 | A1 * | 3/2023 | Kim ...................... | G06V 20/56 |
| | | | | 701/28 |
| 2024/0013423 | A1 * | 1/2024 | Zaheer ................ | G06V 10/454 |
| 2024/0257378 | A1 * | 8/2024 | Nir ........................ | G06V 10/82 |
| 2025/0200780 | A1 * | 6/2025 | Zaheer .................. | G06V 10/82 |

FOREIGN PATENT DOCUMENTS

| | | | | |
|---|---|---|---|---|
| CN | 114550042 | A | 5/2022 | |
| CN | 114550042 | B * | 10/2024 | ............. G01D 18/00 |

* cited by examiner

100

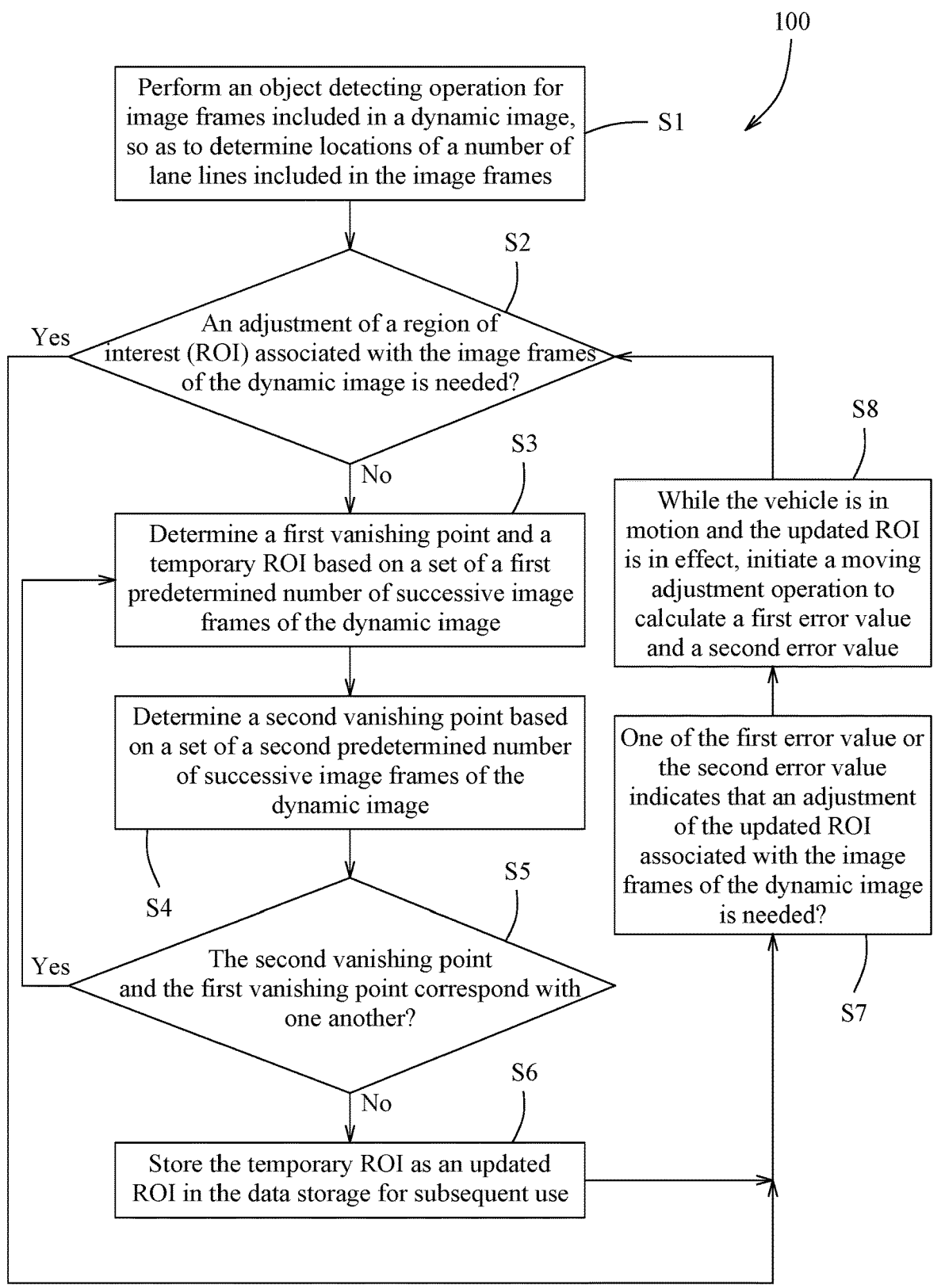

Perform an object detecting operation for image frames included in a dynamic image, so as to determine locations of a number of lane lines included in the image frames — S1

An adjustment of a region of interest (ROI) associated with the image frames of the dynamic image is needed? S2

Yes

No

Determine a first vanishing point and a temporary ROI based on a set of a first predetermined number of successive image frames of the dynamic image S3

Determine a second vanishing point based on a set of a second predetermined number of successive image frames of the dynamic image S4

The second vanishing point and the first vanishing point correspond with one another? S5

Yes

No

Store the temporary ROI as an updated ROI in the data storage for subsequent use S6

One of the first error value or the second error value indicates that an adjustment of the updated ROI associated with the image frames of the dynamic image is needed? S7

While the vehicle is in motion and the updated ROI is in effect, initiate a moving adjustment operation to calculate a first error value and a second error value S8

FIG. 1

METHOD FOR ADJUSTING A REGION OF INTEREST IN A DYNAMIC IMAGE FOR ADVANCED DRIVER-ASSISTANCE SYSTEM, AND IN-VEHICLE ELECTRONIC DEVICE FOR IMPLEMENTING THE METHOD

CROSS-REFERENCE TO RELATED APPLICATION

This application claims priority to Taiwanese Invention patent Application No. 112111133, filed on Mar. 24, 2023, and incorporated by reference herein in its entirety.

FIELD

The disclosure relates to a method for adjusting a region of interest for an advanced driver-assistance system (ADAS), and an in-vehicle electronic device for implementing the method.

BACKGROUND

In the field of autonomous driving, the use of an advanced driver-assistance system (ADAS) to assist driving has become common for the recently manufactured vehicles. Generally, the ADAS may include functions such as lane departure warning, blind spot monitoring, forward collision warning (FCW), brake assist, tire pressure monitoring, etc. For an older vehicle that does not have built-in ADAS, a driving recorder having ADAS features (e.g., an ADAS dash cam) may be installed on the vehicle. The driving recorder includes a camera that continuously captures images in front of the vehicle, and a processor that is configured to process the images for implementing at least some of the above functions. It is noted that the processing of the images typically includes detecting a number of lanes in a number of frames included in a dynamic image. The detection may include, with respect to each of the frames, determining a region of interest (ROI), detecting a location of each lane included in the ROI of the frame, and determining, for example, whether the vehicle has departed from the lane. Typically, the ROI has a shape of a trapezoid, may correspond to a vanishing point associated with two lane lines that define a lane which the vehicle is in, and is related to setup parameters of the driving recorder. Conventionally, the setup parameters may be preset in the driving recorder before the driving recorder leaves the factory, or may be inputted in the driving recorder when the driving recorder is installed on a specific location on the vehicle.

SUMMARY

Typically, since that the setup parameters are preset in the factory for performing in-factory tests for a test vehicle, it is generally recommended for the drivers who purchase the driving recorder to, after manually installing the driving recorder on his/her vehicle on the specific location of his/her choosing, to manually adjust the preset setup parameters based on the specific location. It is noted that since the driving recorder may be inadvertently moved from the specific location on the vehicle, the setup parameters of the driving recorder adjusted for that specific location may become unusable for deciding a region of interest (ROI) since an orientation of the camera may be changed, and vital information may not be in the original ROI. Such a situation may render the ADAS unable to function properly.

Therefore, one object of the disclosure is to provide a method that can dynamically detect the image frames captured by the camera, and to adjust the ROI accordingly.

According to one embodiment of the disclosure, the method is for adjusting a region of interest (ROI) in a dynamic image for an advanced driver-assistance system. The method is implemented by an in-vehicle electronic device that is installed on a vehicle, the in-vehicle electronic device including a processor, a data storage, and a camera that is configured to continuously capture the dynamic image in front of the vehicle. The dynamic image includes a plurality of image frames. The method includes:

a) performing, by the processor, an object detecting operation for each of the image frames included in the dynamic image, so as to obtain a number of lane lines included in the image frame;

b) for each of a set of a first predetermined number of successive image frames of the dynamic image, detecting a pair of lane line segments which is segments of the lane lines within an initial ROI, and determining an intersection point in the image frame at which two imaginary extensions that extend respectively from the lane line segments cross each other, so as to obtain the first predetermined number of pairs of lane line segments and the first predetermined number of intersection points;

c) using the first predetermined number of pairs of lane line segments and the first predetermined number of intersection points, determining a first vanishing point and a temporary ROI corresponding to the first vanishing point;

d) performing an image processing operation on a set of a second predetermined number of successive image frames of the dynamic image that are captured by the camera after the first predetermined number of successive image frames, so as to calculate, for each of the second predetermined number of image frames, a pair of slopes associated with the pair of lane line segments within the temporary ROI, so as to obtain the second predetermined number of pairs of slopes;

e) based on the second predetermined number of pairs of slopes, obtaining a second vanishing point; and f) in a case where the second vanishing point and the first vanishing point are within a predetermined distance, storing the temporary ROI as an updated ROI in the data storage for subsequent use.

Another object of the disclosure is to provide an in-vehicle electronic device that is configured to implement the above-mentioned method.

According to one embodiment of the disclosure, the in-vehicle electronic device is for adjusting a region of interest (ROI) in a dynamic image for an advanced driver-assistance system. The in-vehicle electronic device is installed on a vehicle and includes a processor, a data storage, and a camera that is configured to continuously capture the dynamic image in front of the vehicle. The dynamic image includes a plurality of image frames. The processor is configured 15 to:

perform an object detecting operation for each of the image frames included in the dynamic image, so as to obtain a number of lane lines included in the image frame;

for each of a set of a first predetermined number of successive image frames of the dynamic image, detect a pair of lane line segments which is segments of the lane lines within an initial ROI, and determine an intersection point in the image frame at which two imaginary extensions that extend respectively from the lane line segments cross each other, so as to obtain the first predetermined number of pairs of lane line segments and the first predetermined number of intersection points;

using the first predetermined number of pairs of lane line segments and the first predetermined number of intersection points, determine a first vanishing point and a temporary ROI corresponding to the first vanishing point;

perform an image processing operation on a set of a second predetermined number of successive image frames of the dynamic image that are captured by the camera after the first predetermined number of successive image frames, so as to calculate, for each of the second predetermined number of image frames, a pair of slopes associated with the pair of lane line segments within the temporary ROI, so as to obtain the second predetermined number of pairs of slopes;

based on the second predetermined number of pairs of slopes, obtain a second vanishing point; and in a case where the second vanishing point and the first vanishing point correspond with one another, store the temporary ROI as an updated ROI in the data storage for subsequent use.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

FIG. 1 is a flow chart illustrating steps of a method for automatically adjusting a region of interest in a dynamic image according to one embodiment of the disclosure.

DETAILED DESCRIPTION

Figure 2:
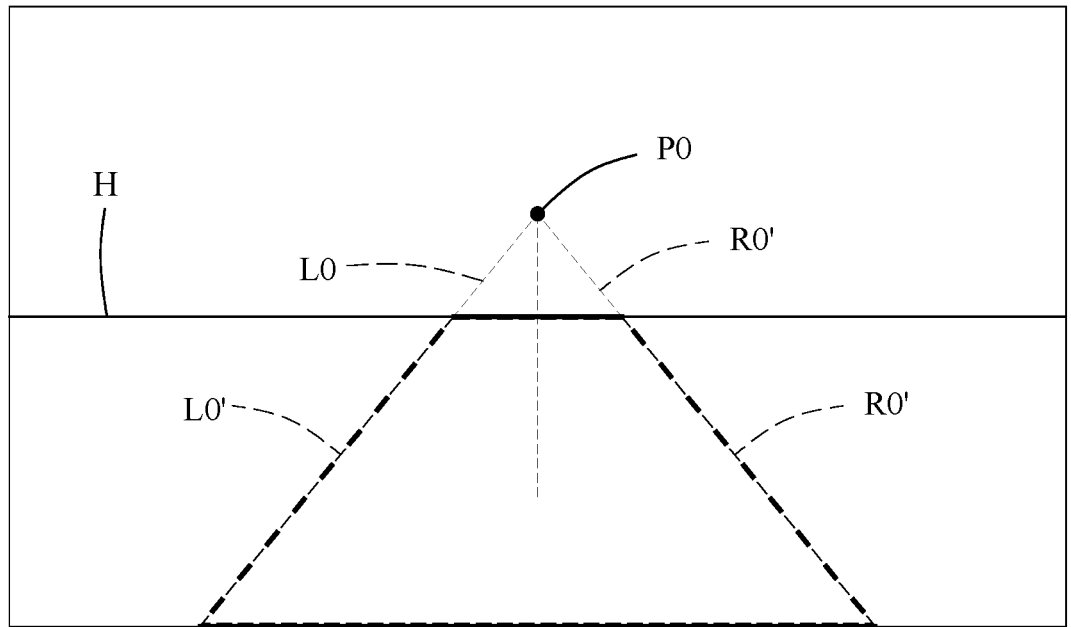
FIG. 2 illustrates one exemplary image frame included in the dynamic image according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

FIG. 1 is a flow chart illustrating steps of a method 100 for automatically adjusting a region of interest (ROI) in a dynamic image according to one embodiment of the disclosure. In some embodiments, the method is implemented by an in-vehicle electronic device installed on a vehicle. In embodiments, the in-vehicle electronic device may be embodied using a driving recorder, and may be embodied using other suitable electronic devices (e.g., a computer, a laptop, a smartphone, etc.) that contain the functionalities as described below.

Figure 4:
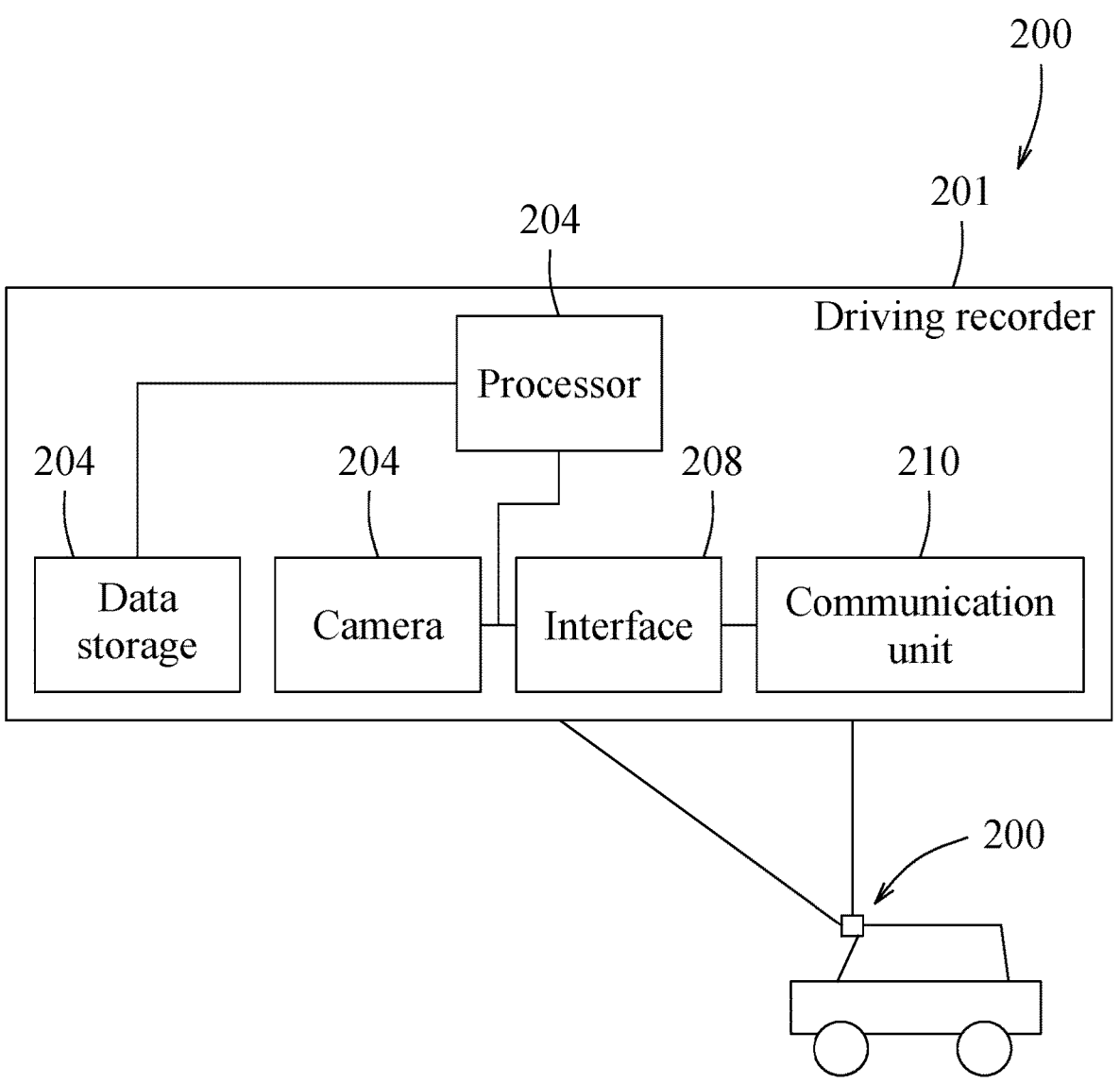
FIG. 4 illustrates an exemplary driving recorder to be installed on a vehicle.

FIG. 4 illustrates an exemplary driving recorder 200 to be installed on a vehicle to serve as the in-vehicle electronic device. The vehicle may be an automobile in some embodiments. The driving recorder 200 includes a housing 201, a processor 202, a data storage 204, a camera 206, an interface 208, and a communication unit 210.

The processor 202 is disposed in the housing 201, may be embodied using a central processing unit (CPU), a microprocessor, a microcontroller, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), and/or etc.

The data storage 204 is disposed in the housing 201 and connected to the processor 202, and may be embodied using, for example, random access memory (RAM), read only memory (ROM), programmable ROM (PROM), firmware, flash memory, etc. In this embodiment, the data storage 104 stores a software application therein. The software application includes instructions that, when executed by the processor 102, cause the processor 202 to implement the operations as described below. For example, the software application may be advanced driver assistance system (ADAS) software for driving assistance. Generally, the ADAS software may implement functions (referred to as ADAS functions hereinafter) such as lane departure warning, blind spot monitoring, forward collision warning (FCW), tire pressure monitoring, etc.

The camera 206 is connected to the processor 202, and is disposed on the housing 201 to face a front direction with respect to the vehicle so as to capture a dynamic image in front of the vehicle. In the disclosure, the term "dynamic image" refers to a collection of image frames taken sequentially by the camera 206, and includes a plurality of image frames.

The interface 208 is connected to the processor 202, and may be embodied using a touch screen and/or a set of buttons on the housing 201 to enable the driver to interact with the driving recorder 200.

The communication unit 210 is disposed in the housing 201 and connected to the processor 202, and may include one or more of a radio-frequency integrated circuit (RFIC), a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G), the fourth generation (4G) or fifth generation (5G) of wireless mobile telecommunications technology, or the like. The communication unit 210 enables the driving recorder 200 to communicate with a remote server such as a cloud server.

In use, when the vehicle is in motion, a driver may operate the interface 208 so as to activate the ADAS functions of the driving recorder 200. In response, the processor 202 executes the software application to activate the ADAS functions. Alternatively, the processor 202 may be configured to execute the software application to activate the ADAS functions as soon as the vehicle is started. Then, the steps of the method 100 may be implemented.

In step S1, the processor 202 activates the camera 206, so as to cause the camera to continuously capture images, and to obtain a dynamic image. Then, the processor 202 performs an object detecting operation, which includes image classification and object localization, for each of the image frames included in the dynamic image, so as to determine locations of a number of lane lines included in the image frame. Typically, two adjacent lane lines define a lane there between, and the processor 202 may determine whether the vehicle is in a lane by detecting a pair of lane lines on two sides of the vehicle. FIG. 2 illustrates one exemplary image frame included in the dynamic image according to one embodiment of the disclosure. In the example of FIG. 2, two lane lines $L_0$ and $R_0$ are present on the two sides of the vehicle.

In step S2, the processor 202 determines whether an adjustment of an ROI associated with the image frames of the dynamic image is needed. Specifically, in this embodiment, the data storage 204 may include a designated register that stores a binary value indicating whether an adjustment of an ROI associated with the image frames of the dynamic image is needed. For example, a binary value of zero may indicate that an adjustment is needed, and a binary value of 1 may indicate that an adjustment is not needed. In the case where the driving recorder 200 is installed and powered on for the first time, the binary value may be set at a default value of zero. Alternatively, the processor 202 may periodically set the binary value of the designated register to zero. In some embodiments, the user may operate the interface 208 to input an initialization command, and in response to receipt of the initialization command, the processor 202 adjusts the binary value of the designated register to zero. In the case where the processor 202 determines an adjustment is needed, the flow proceeds to step S3. Otherwise, the flow proceeds to step S7.

In step S3, the processor 202 initiates a setting operation. In this embodiment, the setting operation includes, for each of a set of a first predetermined number of successive image frames included in the dynamic image, detecting a pair of lane line segments defining a lane in which the vehicle is in within an initial ROI, determining an intersection point in the image frame at which two imaginary extensions that extend respectively from the lane line segments cross each other, so as to obtain the first predetermined number of pairs of lane line segments and the first predetermined number of intersection points. Then, using the first predetermined number of pairs of lane line segments and the first predetermined number of intersection points, the processor 202 determines a first vanishing point and a temporary ROI corresponding to the first vanishing point.

Figure 3:
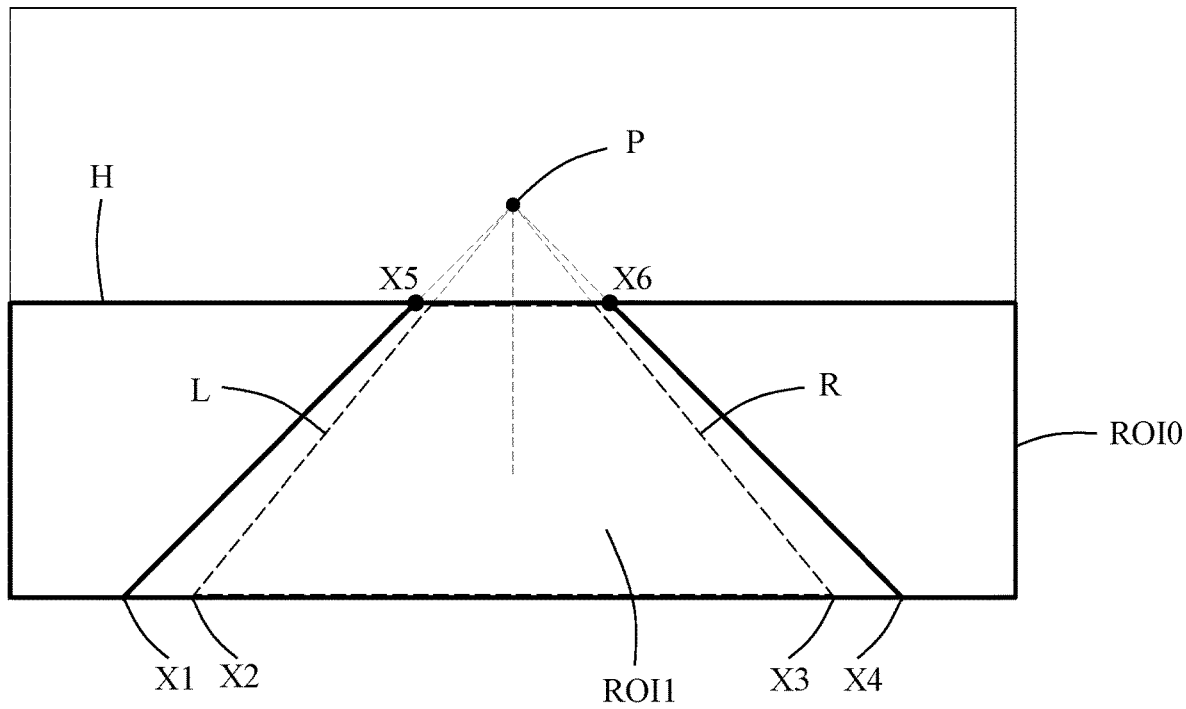
FIG. 3 illustrates the exemplary image frame being processed to determine a first vanishing point according to one embodiment of the disclosure.

FIG. 3 illustrates the exemplary image frame being processed to determine an intersection point according to one embodiment of the disclosure. In the example of FIG. 3, the initial ROI (labeled as $ROI_0$) is a rectangle (a lower half of the image frame under a horizontal line (H)), and the two lane line segments are detected in the initial ROI. It is noted that the lane line segments thus detected in FIG. 3 may be the segments of the lane lines $L_0$ and $R_0$ of FIG. 2 (labeled as $L_0{}'$ and $R_0{}'$, respectively). Based on the lane line segments, $L_0{}'$ and $R_0{}'$, the extensions of the lane line segments $L_0{}'$ and $R_0{}'$ cross at a point, which serves as the intersection point for the image frame (one exemplary intersection point $P_0$ being shown in FIG. 2). It is noted that detecting each of the lane line segments $L_0{}'$ and $R_0{}'$ may include obtaining a plurality of points that present a respective one of the lane line segments.

In some embodiments, the first predetermined number is 100, and the processor 202 is configured to process 100 consecutive image frames, and to obtain 100 pairs of lane line segments and 100 resulting intersection points. Afterwards, the processor 202 performs a linear regression operation for the 100 pairs of lane line segments and the 100 resulting intersection points to determine a pair of fitting lane line segments (L), (R), and obtains a first vanishing point (P) at which the fitting lane line segments (L), (R) converge. Specifically, each of the lane line segments included in each of the 100 pairs of lane line segments and each of the intersection points are applied to the linear regression operation, so as to obtain a first fitting line segment and a second fitting line segment that constitute the pair of fitting lane line segments (L), (R). Then, the first vanishing point (P) is obtained as the intersection point of the extensions of the pair of fitting lane line segments (L), (R). In cases that each of the 100 pairs of lane line segments are identical to the lane line segments as shown FIG. 3, the first vanishing point (P) is located at the intersection point. In other examples where the lane line segments are not identical to one another, the resulting first vanishing point P may be located differently from the intersection point.

Then, the processor 202 obtains the temporary ROI based on the first vanishing point (P). In the example of FIG. 3, the temporary ROI may have a shape of a trapezoid with a long side, a short side that is parallel to the long side, and two legs. The fitting lane line segments (L), (R) cross a lower edge of an image frame at the points X2 and X3, respectively. In this embodiment, the long side of the temporary ROI is obtained by extending a line segment defined by the points X2 and X3. For example, one end point of the long side may be X1, which is obtained by shifting the point X2 to the left by a first predetermined number of pixels (e.g., 20 pixels). The other end point of the lower edge of the long side may be X4, which is obtained by shifting the point X3 to the right by a first predetermined number of pixels (e.g., 20 pixels). In that case, the line segment X1X4 serves as the long side of the temporary ROI.

Then, using the two line segments defined by the points X1, (P) and X4, (P), the two legs of the temporary ROI may be obtained. Specifically, a left leg of the temporary ROI may be a part of the line segment X1P and a right leg of the temporary ROI may be a part of the line segment X4P. In this embodiment, using a pinhole camera model, a horizontal line for defining the short side may be determined based on at least an installation height at which the driving recorder 200 is installed with respect to the ground, and a width of the lane defined by the lane lines. In the example of FIG. 2, based on (1) the width of the lane which may be a pre-stored number (e.g., 3.2 meters), (2) the installation height of the driving recorder 200 which may be 1.4 meters, and (3) a preset distance of detection which is related to the driving recorder 200 and which may be calculated and is typically between 5 to 50 meters, the horizontal line may be determined (e.g., the horizontal line (H) in the example of FIG. 2). It is noted that the calculation of the horizontal line based on the width of lane, the installation height and the preset distance is available in the related art, details thereof are not elaborated for the sake of brevity. It is noted that the line segment X1P crosses the horizontal line H at the point X5, and the line segment X4P crosses the horizontal line H at the point X6. The line segment X5X6 then serves as the short side of the temporary ROI, the line segment X1X5 serves as the left leg of the temporary ROI, and the line segment X4X6 serves as the right leg of the temporary ROI.

After the temporary ROI is obtained, in step S4, the processor 202 performs an image processing operation on a set of a second predetermined number of successive image frames of the dynamic image that are captured by the camera 206 after the first predetermined number of successive image frames, so as to calculate, for each of the second predetermined number of image frames, a pair of slopes associated with the pair of lane line segments within the temporary ROI. As such, the image processing operation yields the second predetermined number of pairs of slopes.

Then, based on the second predetermined number of pairs of slopes, the processor 202 determines a second vanishing point.

Specifically, in this embodiment, the second predetermined number is ten. For each of the 10 image frames, two lane line segments are obtained, and two associated slopes are calculated. In this embodiment, the slope of the lane line segment on the left side of the lane for each of the image frames may be grouped into as a first group of slopes, and the slope of the lane line segment on the right side of the lane for each of the image frames may be grouped into as a second group of slopes. Each of the first group of slopes and the second group of slopes include 10 slopes in this embodiment.

Then, the processor 202 determines, for each of the first group of slopes and the second group of slopes, whether an associated lane line segment detected in each of the second predetermined number of image frames are parallel to one another.

Specifically, in the case where each of the slopes included in the first group of slopes is within a predetermined range (e.g., 0-3), the processor 202 may determine that the lane line segment in each of the 10 image frames are parallel to one another. In the case where each of the slopes included in the second group of slopes is within another predetermined range (e.g., −3-0), the processor 202 may determine that the lane line segment in each of the 10 image frames are parallel to one another.

Then, the processor 202 determines, for each of the second predetermined number of image frames, whether the lane line segment on the left side of the lane and the lane line segment on the right side of the land are parallel to each other. It is noted that while the lane line segments as shown on the images frames may be determined as parallel to each other even though they may not "look" that way.

Specifically, in the case where each of the slopes included in the first group of slopes has an absolute value that is within the predetermined range (e.g., 0-3), and that each of the slopes included in the second group of slopes has an absolute value that is within the another predetermined range, the processor 202 may determine that, with respect to each of the 10 image frames, the pair of associated lane line segments detected in the image frame are parallel to one another.

After it is determined that the pair of associated lane line segments detected in each of the second predetermined number of image frames are parallel to one another, the processor 202 proceeds to calculate a first standard deviation for the first group of slopes, and to calculate a second standard deviation for the second group of slopes. It is noted that the operations for calculating the first standard deviation and the second standard deviation is for determining whether the first group of slopes and the second group of slopes obtained have numerical stability.

In the case where the first standard deviation is smaller than a predetermined threshold (e.g., 3), and the second standard deviation is smaller than another predetermined threshold (e.g., 3), the processor 202 proceeds to calculate the second vanishing point using the second predetermined number of image frames. Specifically, for each of the second predetermined number of image frames, the processor 202 calculates one vanishing point using a manner similar to calculating the first vanishing point with respect to each of the 10 image frames, therefore obtaining 10 vanishing points. Then, the processor 202 calculates the second vanishing point by calculating an average location of the 10 vanishing points to serve as the second vanishing point.

Otherwise, the processor 202 may discard the image frames used for calculating, and performs another image processing operation on another set of second predetermined number of successive image frames of the dynamic image (e.g., the next second predetermined number of successive image frames of the dynamic image). That is to say, the second vanishing point is only calculated when it is determined that the first standard deviation is smaller than the predetermined threshold, and the second standard deviation is smaller than another predetermined threshold.

In some embodiments, the operations of step S4 may be implemented in a dynamic manner. That is to say, the data storage 204 may store the image frames in registers in a first in, first out (FIFO) manner, and the first 10 image frames captured by the camera 206 and stored in the registers are processed. As more image frames are captured, the newest images frames may replace the earliest image frames in the registers, and the operations of step S4 may be then implemented.

Then, in step S5, the processor 202 determines whether the second vanishing point and the first vanishing point correspond with one another. Specifically, in this embodiment, the processor 202 determines whether the second vanishing point and the first vanishing point are within a predetermined distance (e.g., 20 pixels). In the case where the second vanishing point and the first vanishing point are within the predetermined distance, the processor 202 determines that the second vanishing point and the first vanishing point correspond with one another (i.e., the location of the first vanishing point is verified by the location of the second vanishing point and deemed to be correct), and therefore no further adjustment is required for now. As such, the flow proceeds to step S6. Otherwise, it may be determined that a current vanishing point has shifted for an amount that may adversely affect the functions of ADAS, and further adjustment is needed. As such, the flow goes back to step S3, and the processor 202 performs the setting operation once again to obtain another first vanishing point to implement another adjustment with respect to another set of the first predetermined number of successive image frames and another set of the second predetermined number of successive image frames of the dynamic image.

In some embodiments, the operations of step S5 may include determining whether a variation amount, which is derived from the slopes of the lane line segments in the first predetermined number of image frames and the slopes of the lane line segments in the second predetermined number of image frames, is larger than the predetermined deviation number. Specifically, an absolute value of each of the slopes of the lane line segments in the first predetermined number of image frames may be processed, and an absolute value of each of the slopes of the lane line segments in the second predetermined number of image frames may be processed, and a root-mean-square error value may be calculated with respect to the above. As such, when it is determined that the variation amount is larger than the predetermined deviation number (e.g., 40), it may be deduced that the shifting amount of the current vanishing point may adversely affect the functions of ADAS, and that further adjustment is needed. That is to say, the flow proceeds to step S6 only when the slopes of the lane line segments in the first predetermined number of image frames and the slopes of the lane line segments in the second predetermined number of image frames indicate the variation amount being smaller than the predetermined deviation number.

Alternatively, in some embodiments, the operations of step S5 may include two determinations so as to see (1) whether the slopes of the lane line segments in the first predetermined number of image frames and the slopes of the lane line segments in the second predetermined number of image frames indicate a variation amount being larger than the predetermined deviation number, and (2) whether the second vanishing point and the first vanishing point are within the predetermined distance (i.e., a distance between second vanishing point and the first vanishing point being smaller in the term of a predetermined number of pixels).

That is to say, the flow proceeds to step S6 only when the slopes of the lane line segments in the first predetermined number of image frames and the slopes of the lane line segments in the second predetermined number of image frames indicate a variation amount being smaller than the predetermined deviation number, and when the second vanishing point and the first vanishing point are within the predetermined distance. Otherwise, in the case where the second vanishing point and the first vanishing point do not correspond with one another, the flow goes back to step S3 for implementing another adjustment.

In step S6, the processor 202 stores the temporary ROI as an updated ROI in the data storage 204 for subsequent use.

Figure 5:
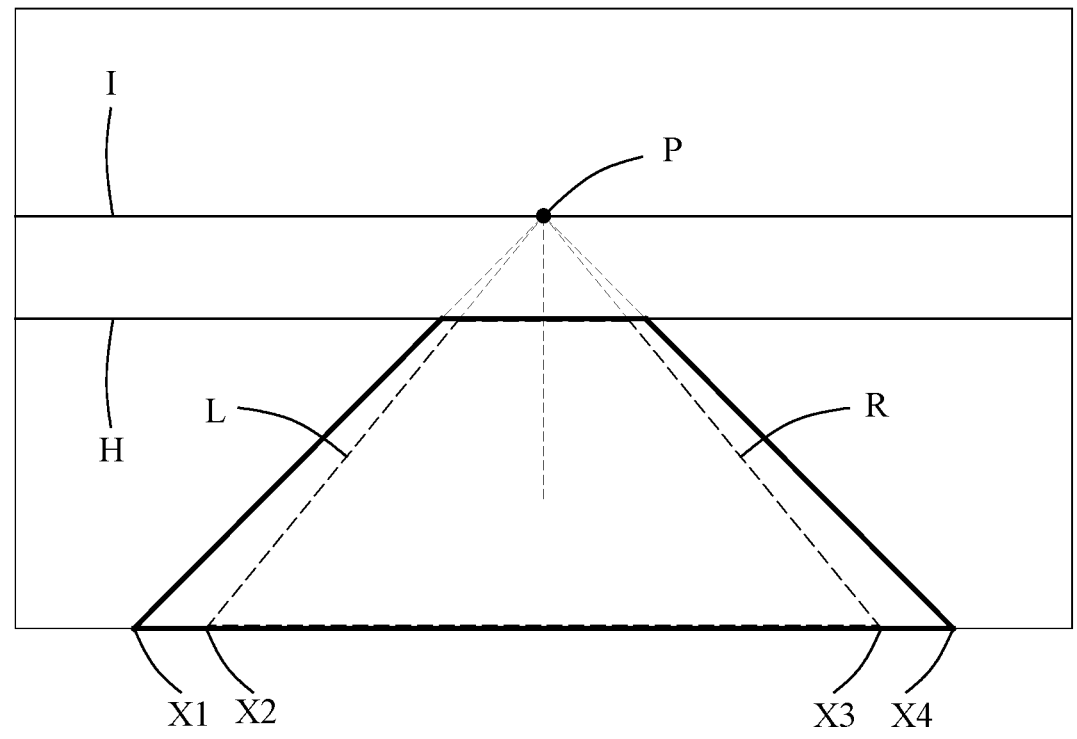
FIG. 5 illustrates one exemplary image frame included in the dynamic image with an updated region of interest according to one embodiment of the disclosure.

In step S7, while the vehicle is in motion and the updated ROI is in effect, the processor 202 initiates a moving adjustment operation. Specifically, the processor 202 calculates, for each of a plurality of candidate image frames included in the dynamic image that are captured by the camera 206 after the second predetermined number of image frames, at least one of a first intersection point or a second intersection point (namely, a first intersection point, or a second intersection point, or both a first intersection point and a second intersection point), so as to obtain at least one of a group of first intersection points or a group of second intersection points. It is noted that the image frames with a pair of lane line segments detected in the updated ROI may be selected as the candidate image frames. FIG. 5 illustrates one exemplary candidate image frame included in the dynamic image according to one embodiment of the disclosure.

The first intersection point is defined as an intersection point between an extension of one of the lane line segments (e.g., the left lane line segment) and a horizontal line (e.g., the line I in FIG. 4) that crosses the first vanishing point, and the second intersection point is defined as an intersection point between an extension of the other one of the lane line segments (e.g., the right lane line segment) and the horizontal line I.

After the first group of intersection points and the second group of intersection points are obtained, the processor 202 calculates a first error value associated with a distance between an average location of the group of first intersection points and the first vanishing point, and calculates a second error value associated with a distance between an average location of the group of second intersection points and the first vanishing point. Specifically, the first error value may indicate the distance (in terms of a number of pixels) between the average location of the first group of intersection points and the first vanishing point, and the second error value may indicate the distance (in terms of a number of pixels) between the average location of the second group of intersection points and the first vanishing point.

It is noted that in some embodiments, in order to reduce the number of calculations needed to implement step S7, only one of the first error value and the second error value is calculated.

In step S8, the processor 202 determines whether one of the first error value or the second error value indicates that an adjustment of the updated ROI associated with the image frames of the dynamic image is needed. Specifically, the processor 202 compares the at least one of the first error value or the second error value with a predetermined motion threshold (which may be a number of pixels, such as 16). When one of the first error value and the second error value is larger than the motion threshold, it may be determined that an adjustment of the updated ROI is needed (which may indicate that the driving recorder 200 has been moved with respect to the vehicle), and the processor 202 sets the binary value of the designated register to zero. Then, the flow goes back to step S2 to implement another adjustment with respect to another set of the first predetermined number of successive image frames and another set of the second predetermined number of successive image frames of the dynamic image.

In sum, the embodiments of the disclosure provide a method for adjusting the region of interest (ROI) for the advanced driver-assistance system (ADAS), and an in-vehicle electronic device for implementing the method. In the method, while the vehicle is in motion, the processor of the in-vehicle electronic device obtains the first predetermined number (e.g., 100) of image frames included in a dynamic image captured by the camera of the in-vehicle electronic device, and calculates the first vanishing point used for obtaining a temporary ROI. Then, the processor obtains the second predetermined number (e.g., 10) of image frames included in the dynamic image, and calculates the second vanishing point. It is noted that the first vanishing point and the second vanishing point are obtained using different manners, and the second vanishing point is complementally obtained as a verification of the first vanishing point. After the first vanishing point has been verified, the temporary ROI is stored as the updated ROI for subsequent use.

The abovementioned method may be particularly useful in the case where the in-vehicle electronic device is firstly installed on the vehicle, or moved to another location on the vehicle. Additionally, after the updated ROI is adopted, when the vehicle is in motion, the processor may periodically implement the moving adjustment operation so as to determine whether an adjustment for the updated ROI is needed. As such, the ADAS may be ensured to function properly even when the in-vehicle electronic device may be unintentionally moved during driving of the vehicle.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for adjusting a region of interest (ROI) in a dynamic image for an advanced driver-assistance system, the method being implemented by an in-vehicle electronic device that is installed on a vehicle for capturing a dynamic image including a plurality of image frames, the method comprising steps of:

a) performing an object detecting operation for each of the image frames included in the dynamic image, so as to obtain a number of lane lines included in the image frame;

b) for each of a set of a first predetermined number of successive image frames of the dynamic image, detecting a pair of lane line segments which is segments of the lane lines within an initial ROI, and determining an intersection point in the image frame at which two imaginary extensions that extend respectively from the lane line segments cross each other, so as to obtain the first predetermined number of pairs of lane line segments and the first predetermined number of intersection points;

c) using the first predetermined number of pairs of lane line segments and the first predetermined number of intersection points, determining a first vanishing point and a temporary ROI corresponding to the first vanishing point;

d) performing an image processing operation on a set of a second predetermined number of successive image frames of the dynamic image that are captured by the camera after the first predetermined number of successive image frames, so as to calculate, for each of the second predetermined number of image frames, a pair of slopes associated with the pair of lane line segments within the temporary ROI, so as to obtain the second predetermined number of pairs of slopes;

e) based on the second predetermined number of pairs of slopes, obtaining a second vanishing point; and f) in a case where the second vanishing point and the first vanishing point are within a predetermined distance, storing the temporary ROI as an updated ROI in the data storage for subsequent use.

2. The method as claimed in claim 1, further comprising, in a case where the second vanishing point and the first vanishing point are not within the predetermined distance, repeating steps b) to f) with respect to another set of the first predetermined number of successive image frames of the dynamic image.

3. The method as claimed in claim 1, wherein in step c), determining the temporary ROI includes defining the temporary ROI with a shape of a trapezoid with a long side, a short side that is parallel to the long side, a left leg and a right leg, the left leg and the right leg being calculated based on the pair of lane line segments and the first vanishing point, the long side and the short side being determined based on at least a height of the in-vehicle electronic device and a width of the lane defined by the lane line segments.

4. The method as claimed in claim 3, wherein step c) includes performing a linear regression operation for the first predetermined number of pairs of lane line segments and the first predetermined number of intersection points to determine a pair of fitting lane line segments, and obtains a first vanishing point at which the fitting lane line segments converge.

5. The method as claimed in claim 1, wherein step e) includes:

grouping the slope of one of the lane line segments for each of the second predetermined number of image frames into a first group of slopes, and grouping the slope of the other one of the lane line segments for each of the second predetermined number of image frames into a second group of slopes;

when it is determined, based on each of the first group of slopes and the second group of slopes, that an associated lane line segment detected in each of the second predetermined number of image frames are parallel to one another, and when it is determined that, for each of the second predetermined number of image frames, the lane line segments detected in the image frame are parallel to each other, calculating a first standard deviation for the first group of slopes, and calculating a second standard deviation for the second group of slopes; and in a case where the first standard deviation is smaller than a predetermined threshold and the second standard deviation is smaller than another predetermined threshold, calculating the second vanishing point using the second predetermined number of image frames.

6. The method as claimed in claim 5, wherein calculating the second vanishing point includes calculating one vanishing point for each of the second predetermined number of image frames so as to obtain the second predetermined number of vanishing points, and calculating an average location of the second predetermined number of vanishing points to serve as the second vanishing point.

7. The method as claimed in claim 1, further comprising, after step f):

while the vehicle is in motion, initiating a moving adjustment operation that includes calculating, for each of a plurality of candidate image frames included in the dynamic image, a first intersection point and a second intersection point, so as to obtain at least one of a group of first intersection points and a group of second intersection points, the first intersection point being an intersection point between an extension of one of the lane line segments and a horizontal line that crosses the first vanishing point, the second intersection point being an intersection point between an extension of another one of the lane line segments and the horizontal line, calculating a first error value associated with the group of first intersection points and the first vanishing point, and calculating a second error value associated with the group of second intersection points and the first vanishing point; and determining whether at least one of first error value and the second error value indicates that an adjustment of the updated ROI is needed.

8. The method as claimed in claim 7, wherein when one of the first error value and the second error value is larger than a predetermined motion threshold, repeating steps b) to f) with respect to another set of the first predetermined number of successive image frames of the dynamic image.

9. The method as claimed in claim 8, wherein the first error value indicates a distance between an average location of the first group of intersection points and the first vanishing point, and the second error value indicates a distance between an average location of the group of second intersection points and the first vanishing point.

10. An in-vehicle electronic device for adjusting a region of interest (ROI) in a dynamic image for an advanced driver-assistance system, the in-vehicle electronic device being installed on a vehicle and comprising a processor, a data storage, and a camera that is configured to continuously capture the dynamic image in front of the vehicle, the dynamic image including a plurality of image frames, wherein the processor is configured to:

perform an object detecting operation for each of the image frames included in the dynamic image, so as to obtain a number of lane lines included in the image frame;

for each of a set of a first predetermined number of successive image frames of the dynamic image, detect a pair of lane line segments which is segments of the lane lines within an initial ROI, and determine an intersection point in the image frame at which two imaginary extensions that extend respectively from the lane line segments cross each other, so as to obtain the first predetermined number of pairs of lane line segments and the first predetermined number of intersection points;

using the first predetermined number of pairs of lane line segments and the first predetermined number of intersection points, determine a first vanishing point and a temporary ROI corresponding to the first vanishing point;

perform an image processing operation on a set of a second predetermined number of successive image frames of the dynamic image that are captured by the camera after the first predetermined number of successive image frames, so as to calculate, for each of the second predetermined number of image frames, a pair of slopes associated with the pair of lane line segments within the temporary ROI, so as to obtain the second predetermined number of pairs of slopes;

based on the second predetermined number of pairs of slopes, obtain a second vanishing point; and in a case where the second vanishing point and the first vanishing point correspond with one another, store the temporary ROI as an updated ROI in the data storage for subsequent use.

11. The in-vehicle electronic device as claimed in claim 10, wherein the processor is further configured to, in a case where the second vanishing point and the first vanishing point do not correspond with one another, perform, with respect to another set of the first predetermined number of successive image frames and another set of the second predetermined number of successive image frames of the dynamic image, the operations of obtaining the first vanishing point and the second vanishing point, and storing the temporary ROI as an updated ROI in a case where the second vanishing point and the first vanishing point correspond with one another.

12. The in-vehicle electronic device as claimed in claim 10, wherein:

the processor is configured to determine the temporary ROI by defining the temporary ROI with a shape of a trapezoid with a long side, a short side that is parallel to the long side, a left leg and a right leg;

the left leg and the right leg are calculated based on the pair of lane line segments and the first vanishing point and the long side and the short side are determined based on at least a height of the in-vehicle electronic device and a width of the lane defined by the lane line segments.

13. The in-vehicle electronic device as claimed in claim 12, wherein the processor is configured to determine the first vanishing point by performing a linear regression operation for the first predetermined number of pairs of lane line segments and the first predetermined number of intersection points to determine a pair of fitting lane line segments, and determining the first vanishing point at which the fitting lane line segments converge.

14. The in-vehicle electronic device as claimed in claim 10, wherein the processor is configured to determine the second vanishing point by:

grouping the slope of one of the lane line segments for each of the second predetermined number of image frames into a first group of slopes, and grouping the slope of the other one of the lane line segments for each of the second predetermined number of image frames into a second group of slopes;

when it is determined, based on each of the first group of slopes and the second group of slopes, that an associated lane line segment detected in each of the second predetermined number of image frames are parallel to one another, and when it is determined that, for each of the second predetermined number of image frames, the lane line segments detected in the image frame are parallel to each other, calculating a first standard deviation for the first group of slopes, and calculating a second standard deviation for the second group of slopes; and in a case where the first standard deviation is smaller than a predetermined threshold and the second standard deviation is smaller than another predetermined threshold, calculating the second vanishing point using the second predetermined number of image frames.

15. The in-vehicle electronic device as claimed in claim 14, wherein the processor is further configured to calculate the second vanishing point by calculating one vanishing point for each of the second predetermined number of image frames so as to obtain the second predetermined number of vanishing points, and calculating an average location of the second predetermined number of vanishing points to serve as the second vanishing point.

16. The in-vehicle electronic device as claimed in claim 10, wherein the processor is further configured to:

while the vehicle is in motion, initiate a moving adjustment operation that includes calculating, for each of a plurality of candidate image frames included in the dynamic image, a first intersection point and a second intersection point, so as to obtain at least one of a group of first intersection points and a group of second intersection points, the first intersection point being an intersection point between an extension of one of the lane line segments and a horizontal line that crosses the first vanishing point, the second intersection point being an intersection point between an extension of another one of the lane line segments and the horizontal line, calculating a first error value associated with the group of first intersection points and the first vanishing point, and calculating a second error value associated with the group of second intersection points and the first vanishing point; and determining whether one of the first error value and the second error value indicates that an adjustment of the updated ROI is needed.

17. The in-vehicle electronic device as claimed in claim 16, wherein the processor is further configured to, in a case where at least one of first error value and the second error value is larger than a predetermined motion threshold perform, with respect to another set of the first predetermined number of successive image frames and another set of the second predetermined number of successive image frames of the dynamic image, the operations of obtaining the first vanishing point and the second vanishing point, and storing the temporary ROI as an updated ROI in a case where the second vanishing point and the first vanishing point correspond with one another.

18. The in-vehicle electronic device as claimed in claim 17, wherein the first error value indicates a distance between an average location of the first group of intersection points and the first vanishing point, and the second error value indicates a distance between an average location of the group of second intersection points and the first vanishing point.

* * * * *